Aug. 9, 1927.

A. A. CAILLE 1,638,524

WEIGHT INDICATOR

Filed Sept. 23, 1921

3 Sheets-Sheet 1

INVENTOR.
Adolph A. Caille
BY Edward N. Pagelsen
ATTORNEY.

Aug. 9, 1927.

A. A. CAILLE

WEIGHT INDICATOR

Filed Sept. 23, 1921

1,638,524

3 Sheets-Sheet 2

INVENTOR.
Adolph A. Caille
BY Edward N. Pagelsen
ATTORNEY.

Aug. 9, 1927.
A. A. CAILLE
1,638,524
WEIGHT INDICATOR
Filed Sept. 23, 1921   3 Sheets-Sheet 3
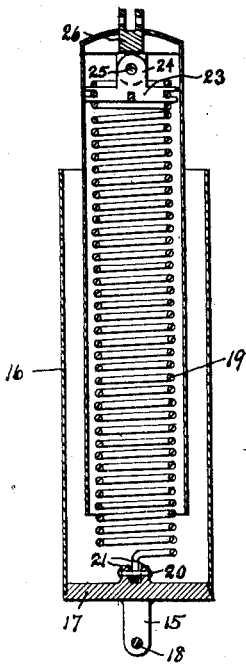
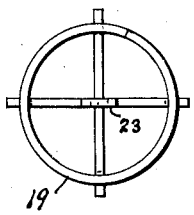
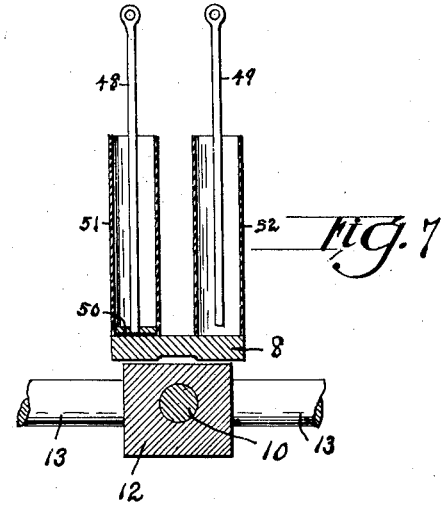
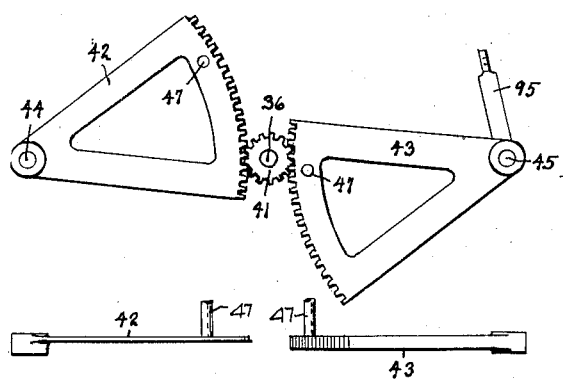
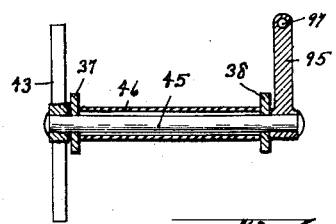
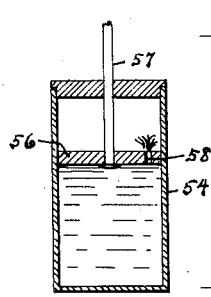
INVENTOR.
Adolph A. Caille.
BY Edward N. Pagelsen
ATTORNEY.

Patented Aug. 9, 1927.

1,638,524

UNITED STATES PATENT OFFICE.

ADOLPH A. CAILLE, OF DETROIT, MICHIGAN.

WEIGHT INDICATOR.

Application filed September 23, 1921. Serial No. 502,675.

This invention relates to that type of weighing scales in which the indicating mechanism is released upon the insertion of a coin or other check, and its object is to provide means for indicating the weight of the article or person upon the scale at all times so long as such weight is below a predetermined limit; to provide a suspending device for load resisting springs which will permit of ready adjustment; to provide an actuating device for the indicating pointer which will operate with a minimum of friction; and to provide means which will render the indicating mechanism inoperative when the load on the scale is decreased, as when one of two persons on the scale steps off.

This invention consists in the details of construction illustrated in the accompanying drawings and particularly pointed out in the claims.

Figure 1:
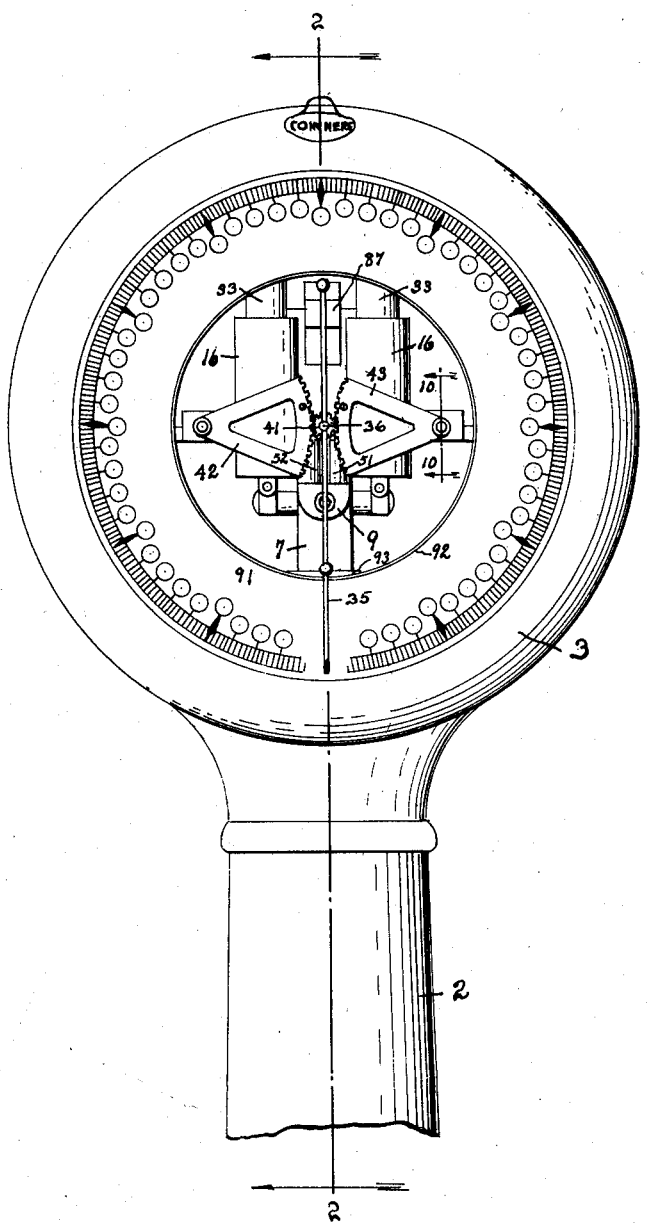
Figure 2:
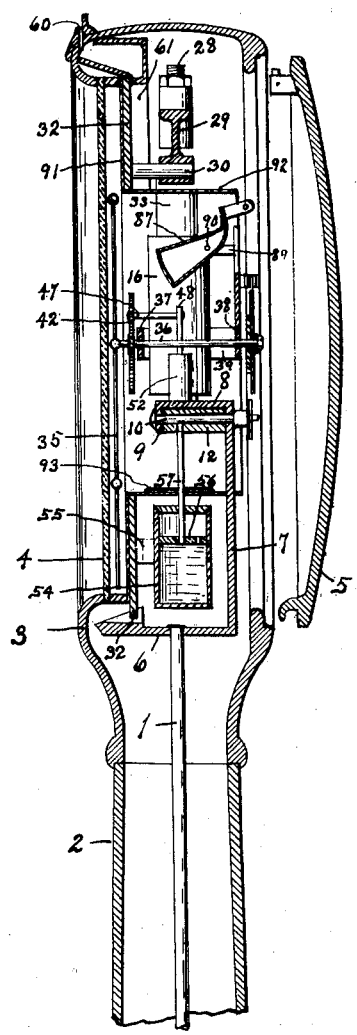
Figure 3:
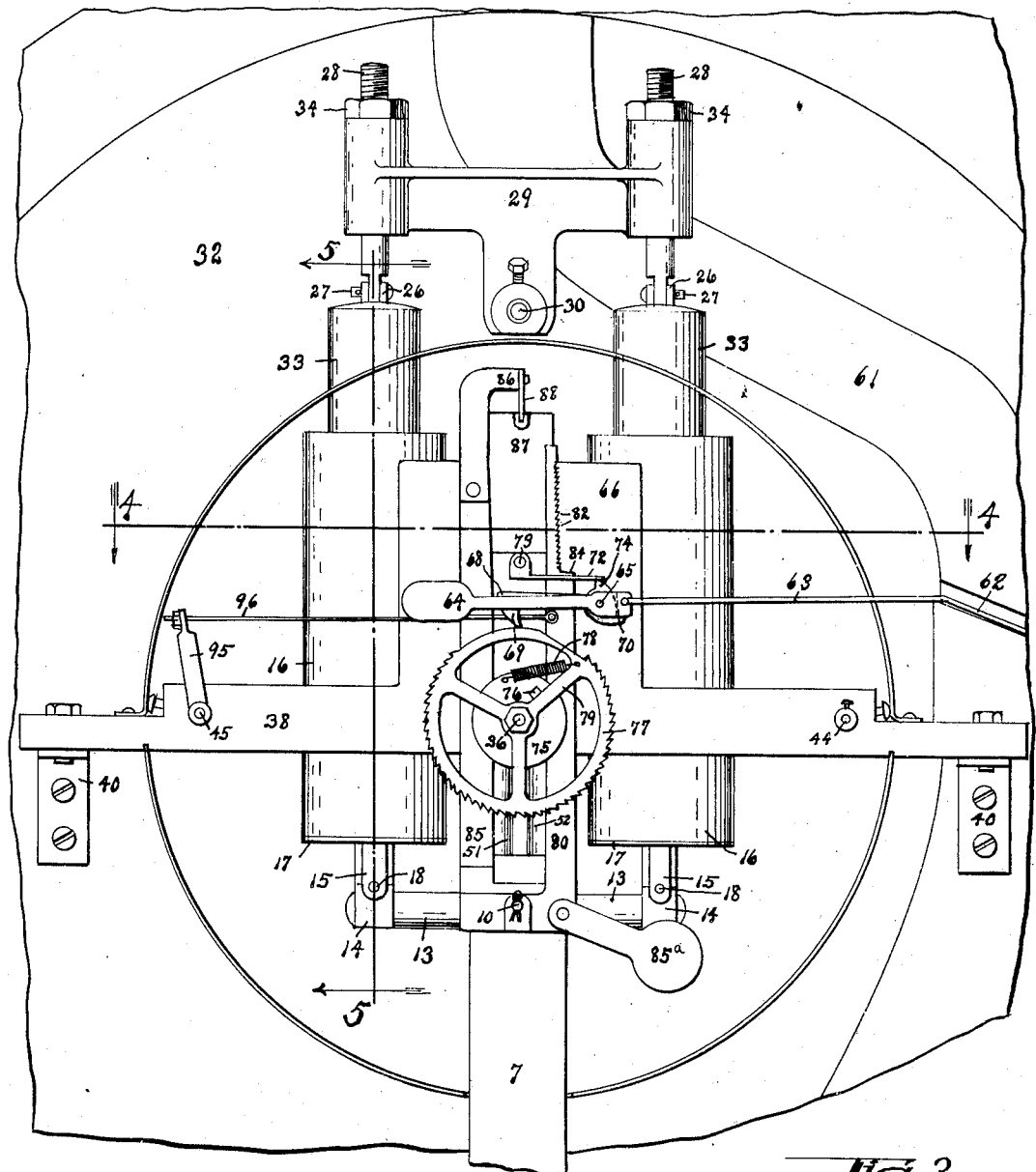
Figure 4:
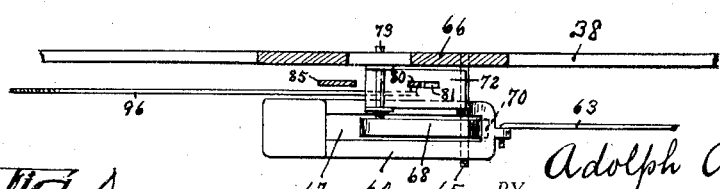

In the drawings, Fig. 1 is a front elevation of the upper portion of a scale embodying my invention. Fig. 2 is a section on the line 2—2 of Fig. 1. Fig. 3 is a rear elevation of the indicating mechanism. Fig. 4 is a section of the rear portion thereof on the line 4—4 of Fig. 3. Fig. 5 is a section of a load resisting spring and its casing on the line 5—5 of Fig. 3. Fig. 6 is a plan of a spring hanger. Fig. 7 is a section of a pair of tubes of which one guides the piston which controls the movements of the pointer as seen from the rear. Fig. 8 is a front elevation of a driving segment for the indicating pointer, a balancing segment therefor and the pointer pinion between them. Fig. 9 is a plan of these segments. Fig. 10 is a section on the line 10—10 of Fig. 1. Fig. 11 is a section of a dash pot.

Similar reference characters refer to like parts throughout the several views.

The weight indicating mechanism shown in the drawings may be associated with any desired load-supporting lever system which is adapted to move down a vertical rod 1, against the tension of a spring or springs through substantially equal distances for equal increments of load on the scale, irrespective of the original load thereon, and this lever mechanism and load receiving mechanism is therefore omitted. The load-actuated rod 1 extends up through a column 2 into a circular case 3 whose front side is closed by the disk 4 of glass. The rear of the case may be closed in any desired manner, a door 5 being shown.

At the upper end of the rod 1 is a yoke consisting of the bottom member 6 into which the rod connects, a rear upright portion 7, a top horizontal portion 8 and a front lip 9. A pin 10 is pivoted in the parts 7 and 9 and carries a square sleeve 12 from which the arms 13 extend in opposite directions parallel to the front face. On the ends of these arms the blocks 14 are journaled and straps 15 extend down from the ends 17 of the cylinders 16 and carry pins 18 which extend through these straps.

As indicated in Fig. 5, each load resisting spring 19 extends around a pin 20 which is carried by lugs 21 on the cylinder end 17, and the opposite end of this spring is screwed onto the cross shaped hanger 23 whose eye 24 is supported by the pin 25 in the lower end of the short link 26. Fig. 3 shows these links mounted on pins 27 in the lower ends of the bolts 28, carried by a cross head 29 mounted on a pin 30 which extends rearwardly from the main supporting plate 32 of the indicating mechanism. Cylindrical shells 33 hang down over the upper portions of the springs and into the lower cylinders 17, the springs being thus completely hidden. The nuts 34 permit adjustment of the yoke and therefore of the pointer 35 which is mounted on a shaft 36 and this shaft is journaled in crossbars 37 and 38, of which the former has rearwardly extending ends 39 being connected to the latter and the latter is supported on brackets 40 attached to the plate 32.

The pointer shaft 36 has attached to it a pinion 41 which meshes with the segments 42 and 43 which are mounted on shafts 44 and 45 in these cross bars 37 and 38, these cross bars being held spaced by tubes 46, as shown in Fig. 10 if desired. These segments have rearwardly extending pins 47 which carry depending stems 48 and 49 at their outer ends, the stem 48 being connected to the segment 43 and having a guide disk 50 at its lower end if desired. The stem 49 is put there merely for looks as it and the tube 52 have no duty to perform. Short tubes 51 and 52 are mounted on the top bar 8 of the yoke being connected to the rod 1, and as the segment 43 is heavier than the segment 42, it keeps the stem 48 pressed down against the bottom of the tube 51 whenever the pointer shaft 36 is permitted to turn.

As soon as a load is placed on the rod 1 to pull it down together with the yoke, the stem 48 and segment 43 follow it down and turn the pointer in proportion to the load on the scale. The segment 42 on the opposite side of the pointer shaft steadies the pointer and aids the appearance of the mechanism. I prefer to mount a dash pot 54 on the plate 32 by means of a bracket 55, and the piston 56 and piston rod 57 therein are connected to the square sleeve 12 on the pin 10. The piston is shown to have a small passage 58 in Fig. 11.

The pointer 35 being turned by the weight of the segment 43 a comparatively simple mechanism is sufficient to prevent the movement of the pointer until a proper coin or check is deposited. The front of the case 3, at the top, is formed with a slot 60 to receive coins and a chute 61 conducts these coins to a proper receptacle. While passing down this chute the coins strike a plate 62 at the outer end of the rod 63 and swing it through a considerable arc before the coins roll off the plate.

This rod 63 is connected to a counterbalancing lever 64 pivoted on the pin 65 mounted on an upwardly extending portion 66 of the cross bar 38. This lever is formed with a slot 67 in which a pawl 68 is mounted on the same pin 65, with a hook 69 projecting downward at its free end and a finger 70 extending back of the pin 65 below the lever 64. A latch 72 is pivoted on a pin 73 also carried by this extension 66 and is adapted to drop down in front of the lug 74 on the pawl 68 when that has been swung up.

Secured to the pointer shaft 36 is a disk 75 which carries a lug 76, and a ratchet wheel 77 is loose on this shaft but is held in position by the spring 78 which draws the arm 79 against the lug 76. The ratchet wheel is mutilated so that the hook 69 cannot engage the teeth of this wheel until the shaft 36 has turned through a predetermined angle. This resilient connection between the disk 75 and ratchet wheel 77 prevents sudden pulls on the wheel and the pawl 69 when weights are suddenly placed on the scale and the segment 43 swings down very rapidly.

Mounted on the pin 10 is a bar 80 which extends up through a slot 81 in the latch 72. This bar has upwardly directed teeth 82 and a shoulder 84, and a counterweight 85ᵃ tends to hold the teeth 82 against the outer wall of the slot 81.

A child weighing less than the predetermined amount may step on the scale platform, causing the rod 1, the yoke attached to it and the segment 43 to descend, this resulting in the pointer swinging clockwise in Fig. 1 to indicate the weight. If however, a person of more than the predetermined weight steps onto the platform, the rod 1 and the yoke will descend accordingly, but the hook 69 will engage the teeth of the wheel 77 next the clear space and stop the rotation of the pointer shaft. This results in the guide tube 51 (Fig. 7) descending and leaving the piston 50 suspended. If now a coin be inserted in the slot 60 and permitted to slide down the chute 61 to swing the rod 63, the lever 64 and the pawl 68 will be swung up and the ratchet wheel released. The latch 72 falls back of the lug 74 and holds the pawl elevated but the lever 64 may swing to normal position as soon as the coin has rolled off the end of the rod 63.

The weight of the segment 43 now turns the pointer until the stem 48 attached to this segment engages the top member 8 of the yoke which limits the movement of the segment and thus determines the final position of the pointer. As the rod 1 and the yoke and the pin 10 move down, the rack bar 80 moves with them, sliding its toothed portion down in the slot 81. As soon as any of the load is taken from the scale, the rod 1 and this rack bar 80 rise and the next tooth 82 lifts the free end of the latch 72 out of engagement with the lug 74 on the pawl 68 which immediately falls and engages the ratchet wheel 77. Any attempt to weigh a second person is thereby frustrated.

The latch is now lying on the shoulder 84 of the rack bar. As soon as the segment 43 and the pointer return to zero positions the arm 95 on the shaft 45 of the segment 43 has swung outward to its limit and pulled the rod 96 with it. This rod is slidable in an eye in the upper end of the arm 95 and is connected to the rack bar 80 and pulls this rack bar inward so that its shoulder is entirely within the slot 81 which permits the latch to fall to the position shown in Fig. 3.

In order to prevent the rod 1 from swinging laterally, a bar 85 may be attached to the pin 10 and extend upward to a hook 86 which is connected to a pivoted arm 87 (Fig. 2) by means of a link 88. This arm is shown hollow which form is pleasing to the eye. It is pivoted on the pin 90 between two posts 89 extending forward from the extension 66 on the bar 38.

I have shown a flat ring 91 properly graduated for weights and a cylinder 92 extending rearward therefrom. A small shield 93 may be used to cover the hole in this cylinder 92 through which the piston rod 57 extends.

The details of construction and the proportions of parts may all be changed by those skilled in the art without departing from the spirit of my invention as set forth in the following claims.

I claim:—

1. In a scale, a weight indicating pointer, means to move the pointer, a load actuated device to limit the movement of the pointer, a shaft for the pointer, a ratchet wheel on the shaft, a pawl adapted to engage the ratchet wheel and prevent rotation of the pointer shaft, a lever to lift the pawl, check operated means connected to the lever to swing the same and lift the pawl, a latch to hold the lever elevated, a bar connected to the load actuated device to release the pawl from the latch, and means connected to the pointer operating means to release said bar from said latch.

2. In a weighing scale, a bar movable according to the weight of the load, a freely rotatable pointer and a ratchet wheel and a pinion connected thereto, a segment engaging the pinion and adapted to turn the pointer and also induced by gravity to follow the movements of said bar, a pawl to restrain the movement of the ratchet wheel, pointer and segment, coin controlled means to disengage the pawl from the ratchet wheel to permit the pointer to rotate, a latch to hold the pawl in disengaged position, means connected to said bar to move the latch to inoperative position, and means connected to said segment to release said latch when the pointer and segment reach normal position.

ADOLPH A. CAILLE.